(12) United States Patent
Chavarria et al.

(10) Patent No.: US 10,839,385 B2
(45) Date of Patent: Nov. 17, 2020

(54) METHOD AND SYSTEM FOR PERSONALLY IDENTIFIABLE INFORMATION

(71) Applicant: MASTERCARD INTERNATIONAL INCORPORATED, Purchase, NY (US)

(72) Inventors: Pedro Chavarria, Miami, FL (US); Joseph Hayes, Montclair, NJ (US); Marek Kurylko, Bloomfield, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/381,109

(22) Filed: Apr. 11, 2019

(65) Prior Publication Data

US 2020/0327540 A1  Oct. 15, 2020

(51) Int. Cl.
*G06Q 40/00* (2012.01)
*G06Q 20/38* (2012.01)
*H04L 9/32* (2006.01)

(52) U.S. Cl.
CPC .......... *G06Q 20/385* (2013.01); *G06Q 40/00* (2013.01); *H04L 9/3213* (2013.01)

(58) Field of Classification Search
CPC ..... G06Q 40/00; G06Q 20/385; H04L 9/3213
See application file for complete search history.

(56) References Cited

U.S. PATENT DOCUMENTS

| | | | | |
|---|---|---|---|---|
| 7,765,481 B2* | 7/2010 | Dixon | ............. | G06Q 40/00 705/35 |
| 2003/0097596 A1* | 5/2003 | Muratov | ............. | G06F 21/31 726/26 |
| 2008/0005006 A1* | 1/2008 | Tritt | ............. | G06Q 40/00 705/36 R |
| 2008/0270301 A1* | 10/2008 | Jones | ............. | G06Q 40/00 705/41 |

OTHER PUBLICATIONS

Krista Becker, Mobile Phone: The New Way to Pay?, Feb. 2007, Federal Reserve Bank of Boston, web, 1-11 (Year: 2007).*

* cited by examiner

*Primary Examiner* — I Jung Liu
(74) *Attorney, Agent, or Firm* — Buchanan Ingersoll & Rooney PC

(57) ABSTRACT

A method for subverting open transmission of personally identifiable information through the use of tokenization includes: receiving a token request from an issuing financial institution; identifying a digital token; mapping the identified digital token to a primary account number; transmitting the identified digital token to the issuing financial institution; receiving a data request from a third party, wherein the data request includes the identified digital token; replacing the identified digital token in the data request with the mapped primary account number; transmitting the data request including the mapped primary account number to the issuing financial institution; receiving a data package including one or more items of personally identifiable information; and forwarding the data package.

16 Claims, 7 Drawing Sheets

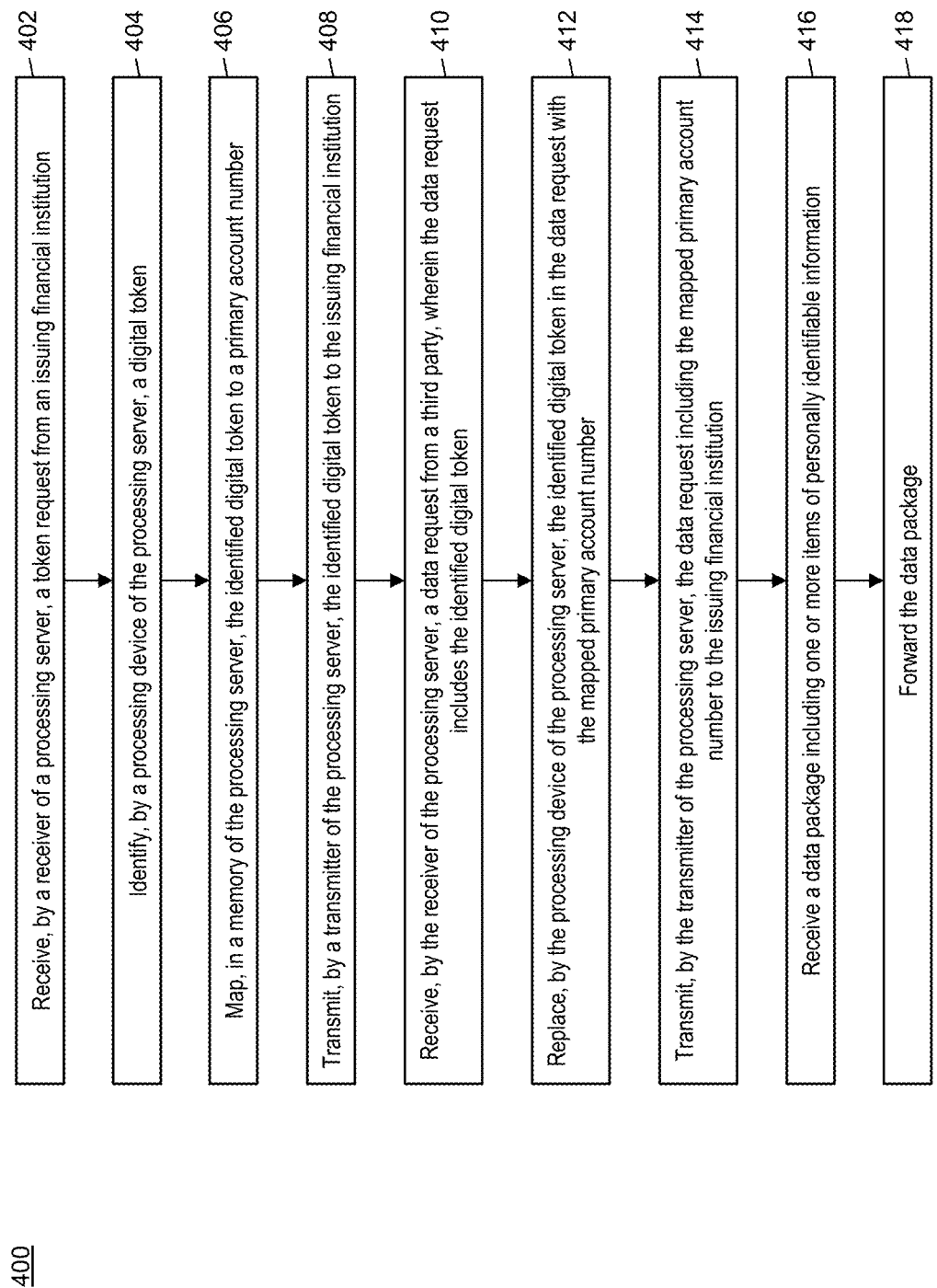

METHOD AND SYSTEM FOR PERSONALLY IDENTIFIABLE INFORMATION

FIELD

The present disclosure relates to subverting open transmission of personally identifiable information through the use of tokenization, specifically the mapping of a primary account number to a digital token and use thereof to convey encrypted personally identifiable information to restrict access thereto and prevent the open transmission thereof.

BACKGROUND

In recent years, individuals have placed higher and higher importance on restricting access to and use of their personally identifiable information (PII). At the same time, many merchants, services, and other entities are interested in acquiring as much PII about each of their customers and potential customers as possible in order to provide greater services, have more effective advertising, and other benefits. In many cases, individuals may be willing to provide their PII to one of these entities. However, individuals may also be wary of openly transmitting their PII, due to the potential for the information to be intercepted, copied, etc. In addition, individuals may not want to keep PII on their personal device or submit PII directly to the entity as a greater precautionary measure.

As a result, an individual may be at odds with how to convey their PII to an entity in order to get benefits from that entity, while still protecting themselves and their PII from unauthorized access and usage. This is due to a technical problem of needing to transmit PII for business purposes but lacking suitable technology. Some methods that have been developed for the transmission of PII use encryption, such as where the entity may provide the individual with an encryption key to use to encrypt their PII, where only that entity has access to the decryption key. While this may protect against intercept of the PII, it does little to protect the user's device and their input of the PII prior to encryption. Thus, there is a need for a technical system that is configured in such a manner as to protect the transmission of PII (or any sensitive information or data) throughout the entire process, and in particular to prevent the input or transmission of any clear PII or other sensitive information or data during any stage of a process.

SUMMARY

The present disclosure provides a description of systems and methods for subverting open transmission of personally identifiable information (PII) or other sensitive information or data through the use of tokenization. A user's issuing financial institution registers with the service through a platform, and receives a digital token that is mapped to a primary account number for the user's transaction account. The digital token is provided to the user from the issuing financial institution. When the user wants a third party to receive access to their PII, they provide the digital token to the third party. The third party can provide this digital token to the platform, which maps the digital token back to the primary account number and forwards it to the issuing financial institution. The issuing financial institution identifies the PII associated with the user's transaction account, encrypts the PII, and forwards it on to the third party. The third party can then decrypt the PII. The result is that the only entity in possession of the PII at any given time is the issuing financial institution (until the PII is provided to the authorized third party), thus preventing unauthorized access to the PII. The user and third party are only ever in possession of a digital token, which protects the user's PII. The transmission of the PII itself is also only when the PII is encrypted, thus preventing open transmission. As a result, the methods and systems discussed herein provide for the distribution of PII without open transmission and with the user not having to enter or possess and of their PII.

A method for subverting open transmission of personally identifiable information through the use of tokenization includes: receiving, by a receiver of a processing server, a token request from an issuing financial institution; identifying, by a processing device of the processing server, a digital token; mapping, in a memory of the processing server, the identified digital token to a primary account number; transmitting, by a transmitter of the processing server, the identified digital token to the issuing financial institution; receiving, by the receiver of the processing server, a data request from a third party, wherein the data request includes the identified digital token; replacing, by the processing device of the processing server, the identified digital token in the data request with the mapped primary account number; transmitting, by the transmitter of the processing server, the data request including the mapped primary account number to the issuing financial institution; receiving a data package including one or more items of personally identifiable information; and forwarding the data package.

A system for subverting open transmission of personally identifiable information through the use of tokenization includes: a receiver of a processing server configured to receive a token request from an issuing financial institution; a processing device of the processing server configured to identify a digital token; a memory of the processing server configured to map the identified digital token to a primary account number; and a transmitter of the processing server configured to transmit the identified digital token to the issuing financial institution, wherein the receiver of the processing server is further configured to receive a data request from a third party, wherein the data request includes the identified digital token, the processing device of the processing server is further configured to replace the identified digital token in the data request with the mapped primary account number, the transmitter of the processing server is further configured to transmit the data request including the mapped primary account number to the issuing financial institution, a data package is received that includes one or more items of personally identifiable information, and the data package is forwarded.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
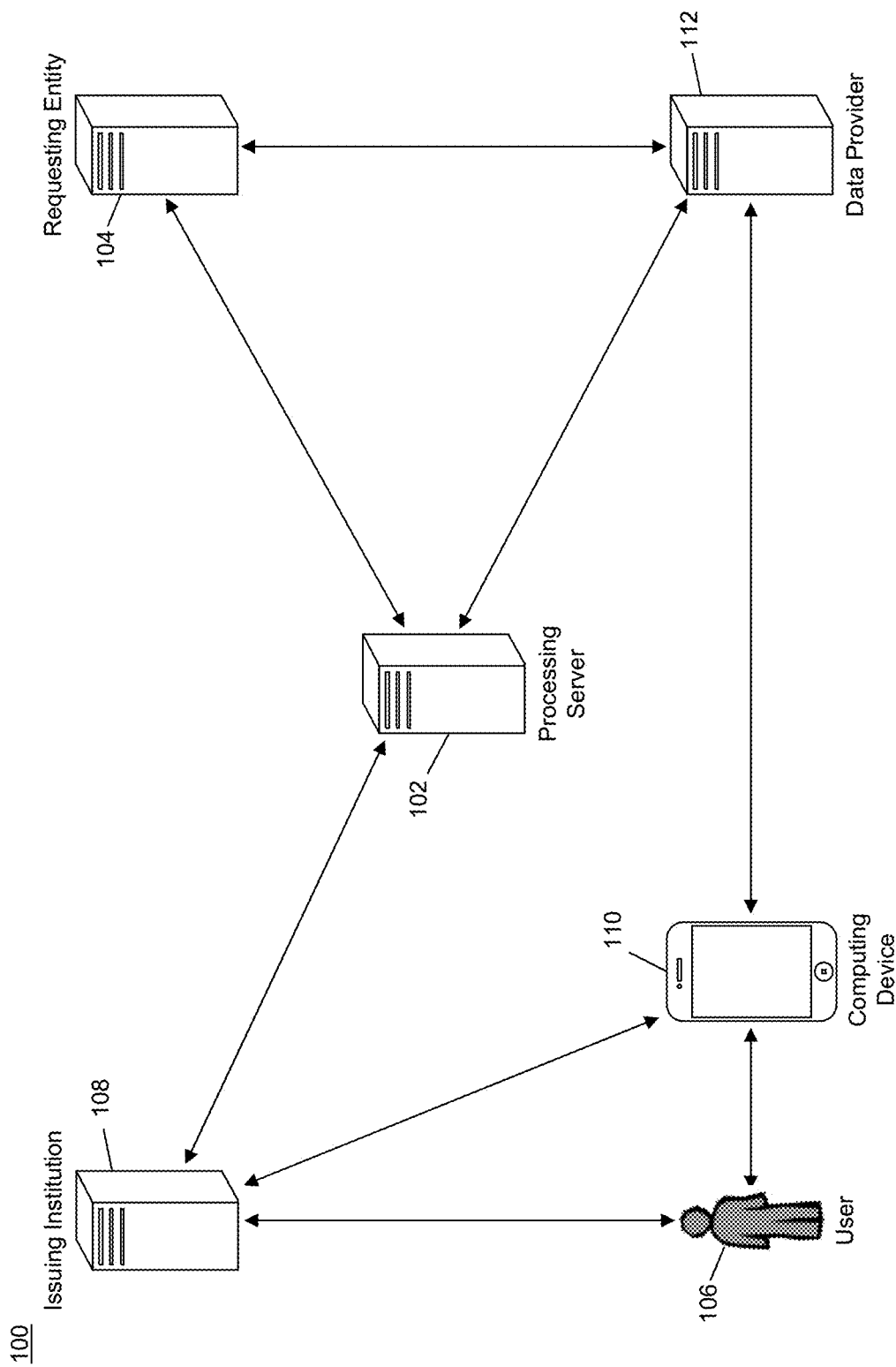
FIG. 1 is a block diagram illustrating a high level system architecture for subverting open transmission of personally identifiable information through tokenization in accordance with exemplary embodiments.
Figure 3A:
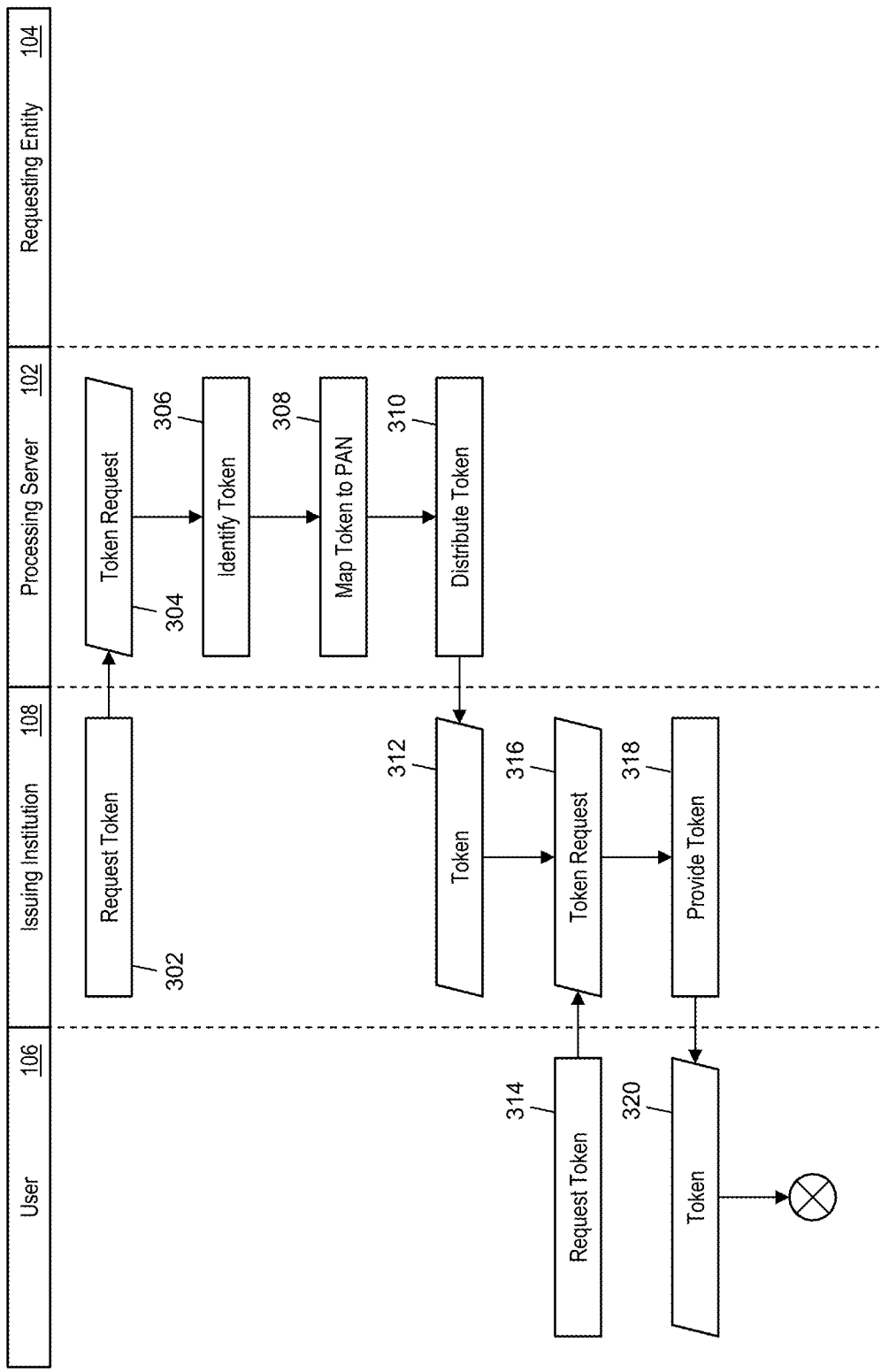
Figure 3B:
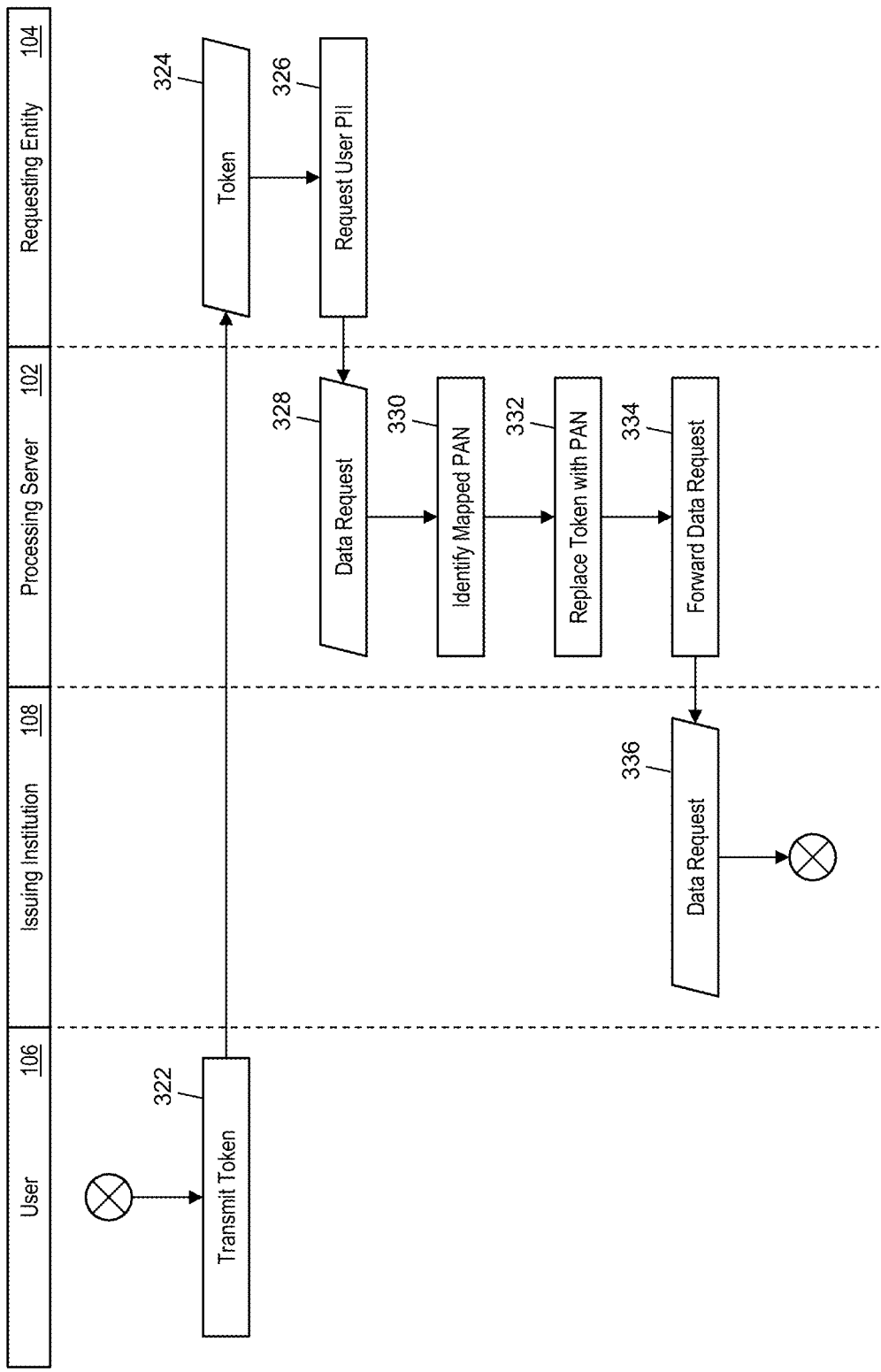
Figure 3C:
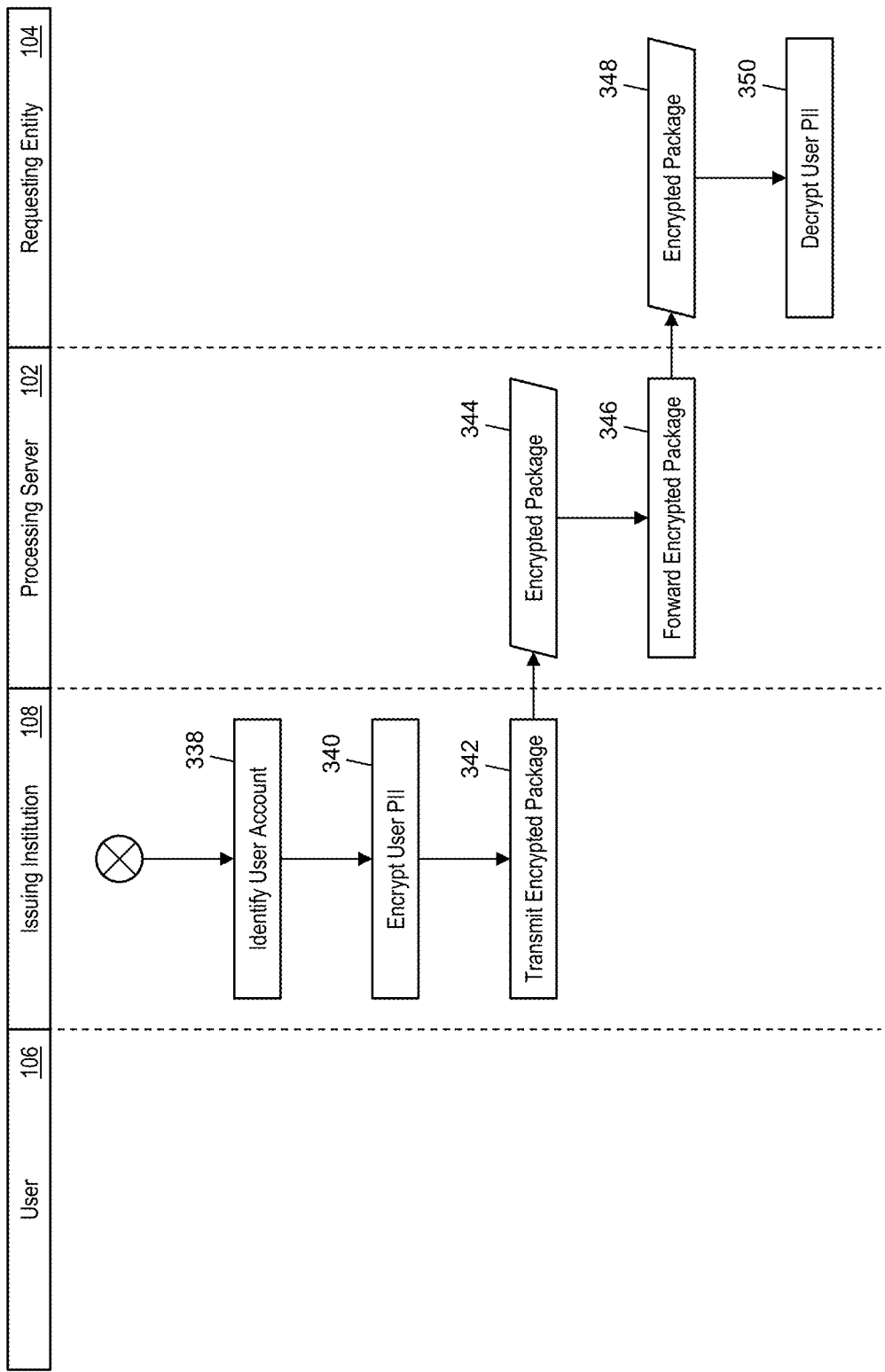

FIGS. 3A-3C in combination are a flow diagram illustrating a process for the transmission of personally identifiable information through the use of tokenization in the system of FIG. 1 in accordance with exemplary embodiments.

FIG. 4 is a flow chart illustrating an exemplary method for subverting open transmission of personally identifiable information through the use of tokenization in accordance with exemplary embodiments.

Figure 5:
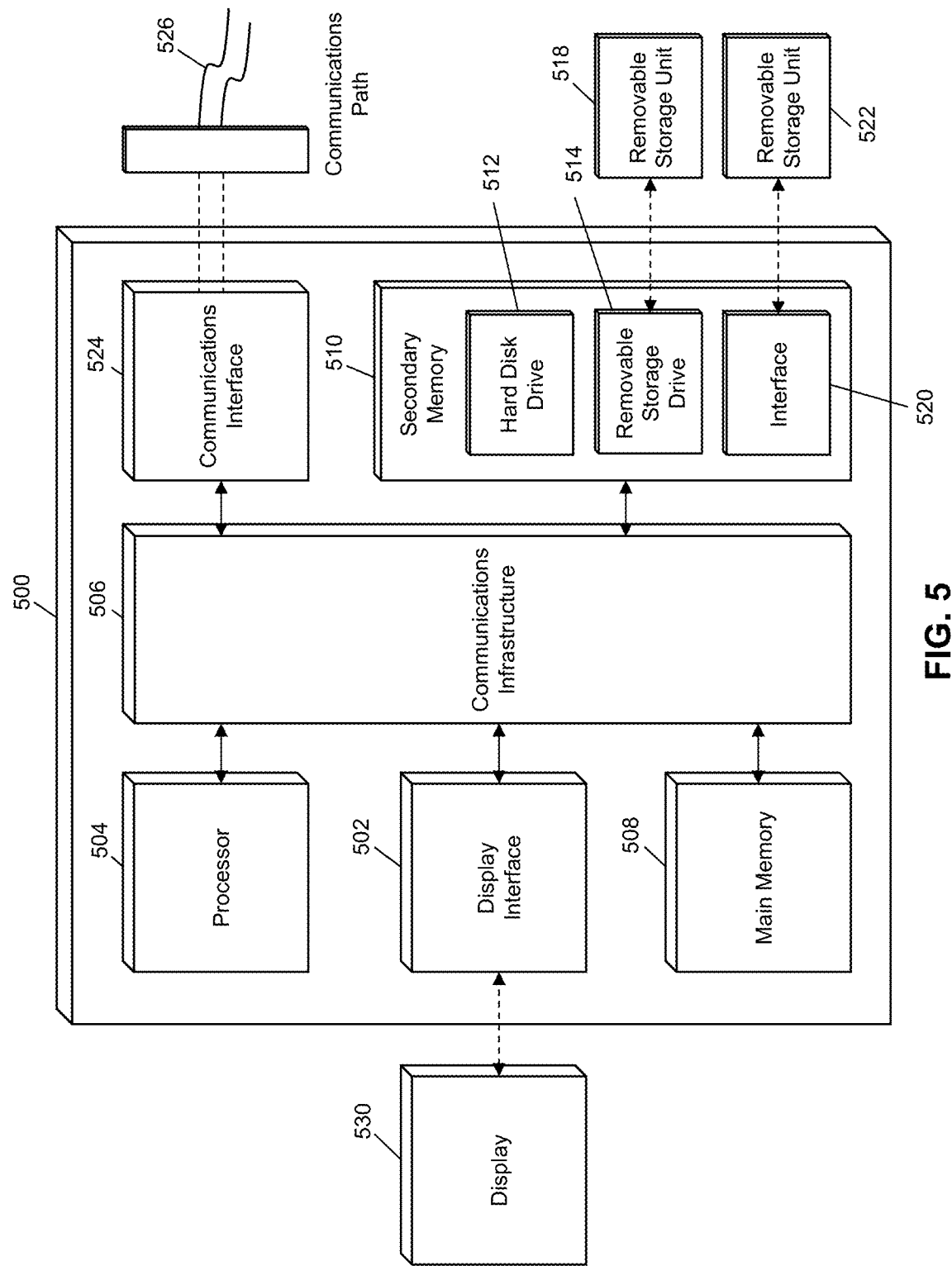

FIG. 5 is a block diagram illustrating a computer system architecture in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Personally identifiable information (PII)—PII may include information that may be used, alone or in conjunction with other sources, to uniquely identify a single individual. Information that may be considered personally identifiable may be defined by a third party, such as a governmental agency (e.g., the U.S. Federal Trade Commission, the European Commission, etc.), a non-governmental organization (e.g., the Electronic Frontier Foundation), industry custom, consumers (e.g., through consumer surveys, contracts, etc.), codified laws, regulations, or statutes, etc. The present disclosure provides for methods and systems where the processing server 102 does not possess any personally identifiable information. Systems and methods apparent to persons having skill in the art for rendering potentially personally identifiable information anonymous may be used, such as bucketing. Bucketing may include aggregating information that may otherwise be personally identifiable (e.g., age, income, etc.) into a bucket (e.g., grouping) in order to render the information not personally identifiable. For example, a consumer of age 26 with an income of $65,000, which may otherwise be unique in a particular circumstance to that consumer, may be represented by an age bucket for ages 21-30 and an income bucket for incomes $50,000 to $74,999, which may represent a large portion of additional consumers and thus no longer be personally identifiable to that consumer. In other embodiments, encryption may be used. For example, personally identifiable information (e.g., an account number) may be encrypted (e.g., using a one-way encryption) such that the processing server 102 may not possess the PII or be able to decrypt the encrypted PII.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal$^e$, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Subverting Open Transmission of Personally Identifiable Information

Using a banking environment as an exemplary environment because of the degree of trust involved (though non-banking embodiments are enabled too), FIG. 1 illustrates a system 100 for the subversion of open transmission of personally identifiable information (PII) or other sensitive information or data through the use of tokenization to enable PII to be provided to a third party as authorized by the associated individual without open transmission thereof.

The system 100 may include a processing server 102. The processing server 102, discussed in more detail below, may be configured to operate as a platform for the distribution and use of digital tokens to enable PII to be provided from a user 106 to a requesting entity 104. In the system 100, a requesting entity 104 may want to receive PII from the user 106. The requesting entity 104 may be a merchant, service provider, or any entity that may desire PII from the user 106. For example, the requesting entity 104 may be a loan provider seeking PII to offer a loan to the user 106, an advertiser wanting PII from the user 106 for better targeting of advertisements thereto, or a potential employer with an open position that the user 106 wants to apply to. The user 106 may be wary of openly transmitting their PII directly to the requesting entity 104, and may instead utilize the platform offered by the processing server 102 to facilitate the distribution of PII to the requesting entity 104.

In the system 100, the user 106 may have an account issued thereto by an issuing institution 108. The issuing institution 108 may be any institution trusted by the user 106 that possesses the user's PII or the user's permission to access and distribute the user's PII. For example, the issuing institution 108 may be an issuing bank or other financial institution that issues a transaction account to the user 106, a social network that issues a social networking account to the user 106, etc. The issuing institution 108 may issue an account to the user 106 and, as part of the issuance of the account thereto, may assign a primary account number to the user 106. The primary account number may be unique to the user 106 and/or their account. For instance, if the account is a transaction account, the primary account number may be a 16 digit account number used in payment transactions that are funded by the transaction account.

The issuing institution 108 may register the user's transaction account with the processing server 102. As part of the registration of the transaction account, the issuing institution 108 may provide the primary account number to the processing server 102 through a suitable communication network and method. For example, the processing server 102 may provide a web or application programming interface to the issuing institution 108 that may be used in communications therewith. The processing server 102 may receive the primary account number and may identify a digital token to be associated therewith. The digital token may be any type of value that is suitable for use in performing the functions discussed herein, such as a numeric or alphanumeric value of sufficient size to provide for uniqueness. For example, the digital token may be a 64-bit alphanumeric value that is randomly or pseudo-randomly generated. The digital token may be unique to the account, and, in some cases, a new digital token may be generated each time a digital token is used for an account such that no digital token may be used twice. The processing server 102 may map the identified digital token to the primary account number.

The processing server 102 may then provide the mapped digital token to the issuing institution 108. The issuing institution 108 may distribute the digital token to the user 106 using any suitable method. For instance, the user 106 may have a computing device 110 associated therewith that the issuing institution 108 may provide the digital token to, such as through an application program associated with the issuing institution 108, short messaging service, multimedia messaging service, e-mail, etc. The computing device 110 may be any type of device suitable for performing the functions discussed herein, such as a desktop computer, laptop computer, tablet computer, notebook computer, cellular phone, smart phone, smart watch, smart television, wearable computing device, etc.

The user 106 may receive the digital token through the computing device 110. When the user 106 wants to provide their PII to the requesting entity 104, they may provide the digital token thereto. In some embodiments, the system 100 may include a data provider 112 that may be used to provide some PII or other data associated with the user 106 to the requesting entity 104. For example, the requesting entity 104 may be a financial services company and the data provider 112 may be a credit bureau where the user 106 may provide the digital token to the credit bureau such that the credit bureau can identify a credit score for the user 106 to provide to the requesting entity 104. As discussed herein, any functions performed by the requesting entity 104 or data provider 112 may be performed by the other entity as appropriate depending on implementation. In some cases, the user 106 may provide the digital token directly to the requesting entity 104, where the requesting entity 104 may forward it to the data provider 112 or otherwise request data from the data provider 112 using the user's PII. In other cases, the user 106 may provide the digital token directly to the data provider 112, but may identify the requesting entity 104 to which the data provider 112 is to provide additional data.

The data provider 112 may receive the digital token from the user 106 (e.g., via the computing device 110 as submitted using any suitable communication network and method). The data provider 112 may then submit the digital token to the processing server 102 using the platform. The processing server 102 may remap the digital token back to the associated primary account number and forward the primary account number to the issuing institution 108. The issuing institution 108 may then identified the PII associated with the user 106 that is tied to the account that is to be provided to the data provider 112 and/or requesting entity 104. In some cases, the issuing institution 108 may prompt the user 106 (e.g., via the computing device 110) to select the PII. In other cases, the user 106 may select the PII when the digital token is first requested from the issuing institution 108.

The issuing institution 108 may electronically transmit the PII to the data provider 112 using a suitable communication network and method. In an exemplary embodiment, the issuing institution 108 may first encrypt the PII using an encryption key, where the data provider 112 may possess the corresponding decryption key, such as through a prearranged exchange of keys between the issuing institution 108 and the data provider 112. The data provider 112 may then receive the encrypted PII and may decrypt it using the decryption key. The data provider 112 can then identify any additional data using the PII and provide it to the requesting entity 104. For example, the issuing institution 108 may identify the user's name and tax identification number as PII and provide it to the data provider 112, a credit bureau. The credit bureau may identify a credit report for the user 106 using the name and tax identification number, and provide the credit report to the requesting entity 104, where the credit report itself may not include any PII (e.g., it may indicate the user's credit worthiness without personally identifying the user 106).

As a result, the requesting entity 104 may receive all of the information that they need without ever obtaining any PII. At the same time, the data provider 112, as an authorized party, may receive PII, but only as authorized by the user 106 and/or issuing institution 108, and not through open transmission thereof. Furthermore, the user 106 may ensure that the requesting entity 104 receives their PII without the user 106 having to input or transmit any PII directly, protecting from the intercept of transmissions therefrom and preventing exposure of PII in cases of theft of the computing device 110. Thus, the methods and systems discussed herein provide for greater security in the transmission of PII than in standard systems through the unique system implementation and use of tokenization.

In some embodiments, a payment network may be used in the transmission of data to and/or from the processing server 102. For instance, in such embodiments, digital tokens may be submitted to the processing server 102 in transaction messages that are electronically transmitted via payment rails associated with a payment network. In some cases, the processing server 102 may be a part of a payment network. A transaction message may be a data message that is specially formatted according to one or more standards governing the interchange of financial transaction messages, such as the International Organization of Standardization's ISO 8583 or ISO 20022 standards. A transaction message may include a message type indicator indicating a type for the message, such as an authorization request or authorization response, and a plurality of data elements, each data element storing data as set forth in the applicable standard(s). In such embodiments, the data provider 112 may submit an authorization request to the processing server 102 that includes the digital token in the data element configured to store the primary account number. The processing server 102 may replace the digital token with the mapped primary account number and forward the authorization request to the issuing institution 108 using the payment rails. In some instances, the PII provided by the issuing institution 108 may be included in an authorization response returned to the processing server 102, which may forward the authorization response on to the data provider 112 (e.g., after replacing the primary account number back with the digital token).

Processing Server

Figure 2:
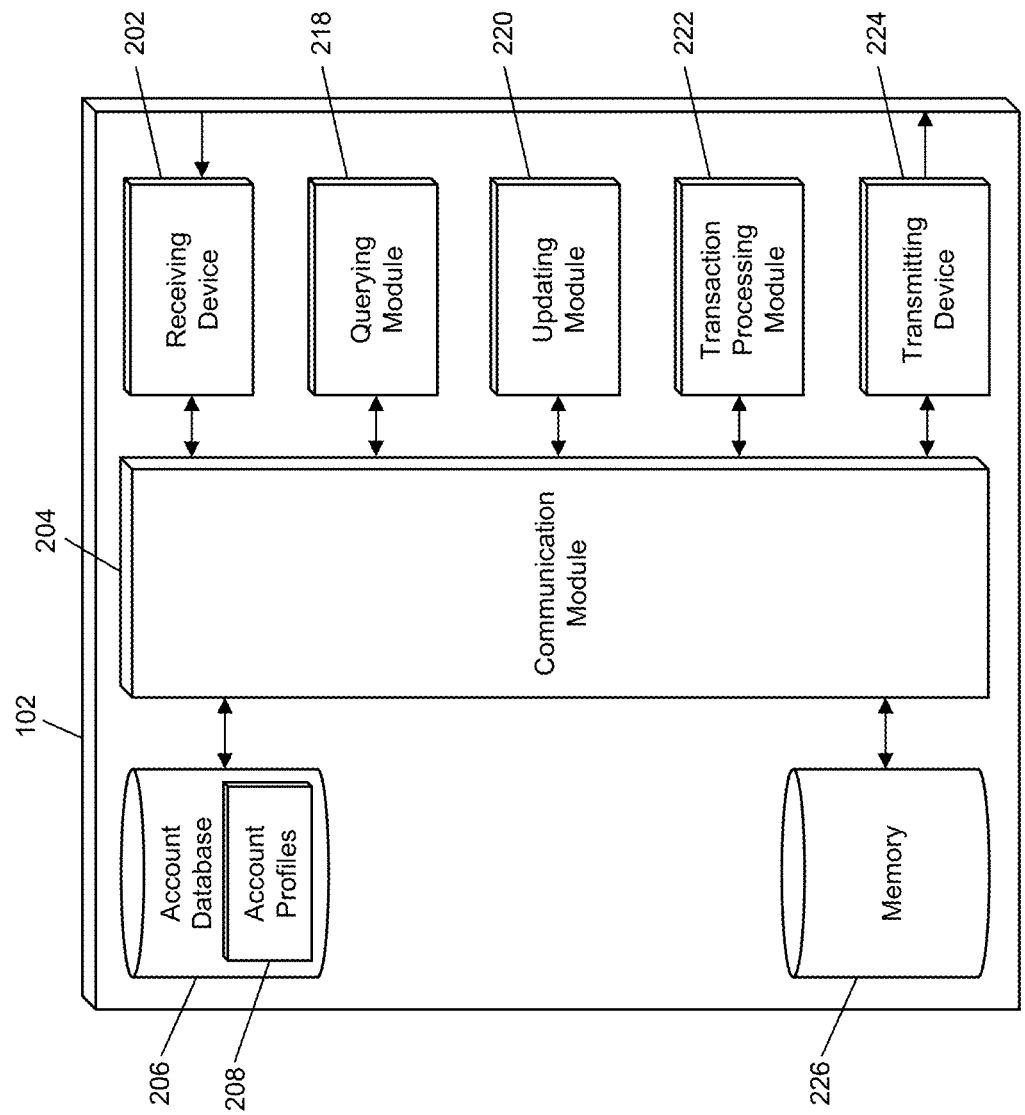
FIG. 2 is a block diagram illustrating the processing server of the system of FIG. 1 for subverting open transmission of personally identifiable information in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from requesting entities 104, issuing institutions 108, data providers 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing institutions 108 that are superimposed or otherwise encoded with registration data for registering an account, which may include a primary account number, or with PII, which may be included in an authorization response formatted according to applicable standards. The receiving device 202 may also be configured to receive data signals electronically transmitted by data providers 112 and/or requesting entities 104 that are superimposed or otherwise encoded with PII requests, which may include a digital token, and, in some cases, may be authorization requests transmitted via payment rails that are formatted according to one or more standards.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, updating module 220, transaction processing module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a registered account, such as an account held by an issuing institution 108 and issued to a user 106. Each account profile 208 may include a digital token and the primary account number mapped thereto. In an exemplary embodiment, an account profile 208 may not store any PII, nor may any PII be obtained or possessed by the processing server 102.

The processing server 102 may include a querying module 218. The querying module 218 may be configured to execute queries on databases to identify information. The querying module 218 may receive one or more data values or query strings, and may execute a query string based thereon on an indicated database, such as the account database 206, to identify information stored therein. The querying module 218 may then output the identified information to an appropriate engine or module of the processing server 102 as necessary. The querying module 218 may, for example, execute a query on the account database 206 to a primary account number mapped to a digital token included in a received data request.

The processing server 102 may also include an updating module 220. The updating module 220 may be configured to update data for use by the processing server 102 in performing the functions discussed herein. The updating module 220 may receive instructions as input, may update data based on the instructions, and may output the updated data to one or more modules of the processing server 102. For example, the updating module 220 may be configured to update data requests received by the receiving device 202 to replace a digital token with a primary account number mapped thereto. In cases where an identifier is to be returned to the data provider 112, the updating module 220 may also update messages with such data included to replace the primary account number (e.g., used by the issuing institution 108) with the mapped digital token.

The processing server 102 may also include a transaction processing module 222. The transaction processing module 222 may be configured to perform functions for the processing server 102 related to the processing of electronic payment transactions as discussed herein. Such functions may include, for example, the forwarding of authorization requests and authorization responses, the generation of authorization responses, the identification of issuing institutions 108, etc. In cases where the processing server 102 is part of a payment network, the transaction processing module 222 may be configured to perform the functions of processing payment transactions for a payment network as will be apparent to persons having skill in the relevant art.

The processing server 102 may also include a transmitting device 224. The transmitting device 224 may be configured to transmit data over one or more networks via one or more network protocols. In some instances, the transmitting device 224 may be configured to transmit data to issuing institutions 108, data providers 112, requesting entities 104, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to issuing institutions 108 that may be superimposed or otherwise encoded with digital tokens as well as messages that include primary account numbers for the requesting of PII associated therewith, which may be transaction messages formatted according to applicable standards. The transmitting device 224 may also be configured to electronically transmit data signals to requesting entities 104 and/or data providers 112 that are superimposed or otherwise encoded with encrypted PII, which may be included an authorization response or other transaction message and may be transmitted via payment rails associated with a payment network.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, communication data for computing devices 110, routing information for transaction messages, transaction message formatting standards, currency exchange rate data and algorithms, digital token generation rules and algorithms, etc.

Process for Transmission of Personally Identifiable Information

FIG. 3 illustrates an example process for the subversion of open transmission of personally identifiable information (PII) through the use of tokenization in the system 100 of FIG. 1.

In step 302, the issuing institution 108 may submit a request for a digital token to the processing server 102. The request may include at least a primary account number associated with an account to which the digital token is to be associated. In step 304, the receiving device 202 of the processing server 102 may receive the request. In step 306, the processing server 102 may identify a digital token using a suitable method. In step 308, the querying module 218 of the processing server 102 may execute a query on an account database 206 of the processing server 102 to update an account profile 208 associated with the account to map the identified digital token to the primary account number included in the received token request. In step 310, the transmitting device 224 of the processing server 102 may electronically transmit data message back to the issuing institution 108 that includes the digital token.

In step 312, the issuing institution 108 may receive the digital token. In step 314, the user 106 may (e.g., via the computing device 110) request a digital token for their account from the issuing institution 108 by submitting a token request thereto using a suitable communication method. The token request may include identifying and authentication information, and, in some cases, the token request may also include information identifying what PII is to be made available through use of the requested token. In step 316, the issuing institution 108 may receive the request. In step 318, the issuing institution 108 may respond to the request by (e.g., following identification of the user's account and authentication thereof) providing the digital token to the user 106 (e.g., via the user's computing device 110). In step 320, the user 106 may receive the digital token.

In step 322, the user 106 may electronically transmit (e.g., via the computing device 110) the digital token to the requesting entity 104 using a suitable communication network and method. In step 324, the requesting entity 104 may receive the digital token. In step 326, the requesting entity 104 may electronically transmit a request for user PII to the processing server 102. The request for user PII may include at least the digital token received from the user 106. In step 328, the receiving device 202 of the processing server 102 may receive the data request including the digital token. In step 330, the querying module 218 of the processing server 102 may execute a query on the account database 206 of the processing server 102 to identify an account profile 208 that includes the digital token to identify the primary account number mapped thereto. In step 332, the updating module 220 of the processing server 102 may update the data request by replacing the digital token with the mapped primary account number.

In step 334, the transmitting device 224 of the processing server 102 may electronically transmit the data request with the primary account number to the issuing institution 108. In step 336, the issuing institution 108 may receive the data request. In step 338, the issuing institution 108 may identify the account associated with the user 106 using the primary account number, and the PII as indicated by the user 106 in the request for the digital token. In step 340, the issuing institution 108 may encrypt the identified PII using a suitable encryption key and method. In step 342, the issuing institution 108 may electronically transmit an encrypted package to the processing server 102. The encrypted package may include the encrypted PII and, in some cases, may also include the primary account number, which may not be encrypted.

In step 344, the receiving device 202 of the processing server 102 may receive the encrypted package from the issuing institution 108. In step 346, the transmitting device 224 of the processing server 102 may transmit the encrypted package to the requesting entity 104. In cases where the encrypted package includes or is accompanied by the primary account number when received by the processing server 102, the updating module 220 of the processing server 102 may replace the primary account number with the mapped digital token prior to forwarding of the package to the requesting entity 104. In step 348, the requesting entity 104 may receive the encrypted PII. In step 350, the requesting entity 104 may decrypt the encrypted user PII using a suitable decryption key and method. The requesting entity 104 may then be free to use the PII, such as in the providing of services to the user 106.

Exemplary Method for Subverting Open Transmission of Personally Identifiable Information FIG. 4 illustrates a method 400 for the subversion of open transmission of personally identifiable information (PII) through the use of tokenization and multiple entities.

In step 402, a token request may be received by a receiver (e.g., the receiving device 202) of a processing server (e.g., the processing server 102) from an issuing financial institution (e.g., the issuing institution 108). In step 404, a digital token may be identified by a processing device of the processing server. In step 406, the identified digital token may be mapped in a memory (e.g., the account database 206, the memory 226, etc.) of the processing server to a primary account number.

In step 408, the identified digital token may be transmitted by a transmitter (e.g., the transmitting device 224) of the processing server to the issuing financial institution. In step 410, a data request may be received by the receiver of the processing server from a third party (e.g., the data provider 112, requesting entity 114, etc.), wherein the data request includes the identified digital token. In step 412, the identified digital token may be replaced in the data request by the processing device (e.g., the updating module 220) of the processing server with the mapped primary account number.

In step 414, the data request including the mapped primary account number may be transmitted by the transmitter of the processing server to the issuing financial institution. In step 416, a data package including one or more items of personally identifiable information may be received. In step 418, the data package may be forwarded.

In one embodiment, the digital token may be a random or pseudo-random alphanumeric value. In some embodiments, the token request may include the primary account number. In one embodiment, the data package may be received by the receiver of the processing server, and the data package may be forwarded by the transmitter of the processing server to the third party. In some embodiments, the data package may be received by a receiver of the third party, and the data package may be forwarded by a transmitter of the third party to a requesting entity.

In one embodiment, the one or more items of personally identifiable information may be encrypted in the data package. In some embodiments, the processing server does not obtain or possess an encryption key suitable for decrypting the encrypted one or more items of personally identifiable information. In one embodiment, the data request may be a transaction message formatted according to one or more standards and includes at least a message type indicator indicative of an authorization request and a plurality of data elements, wherein one of the plurality of data elements stores the identified digital token.

Computer System Architecture

FIG. 5 illustrates a computer system 500 in which embodiments of the present disclosure, or portions thereof, may be implemented as computer-readable code. For example, the processing server 102 of FIG. 1 may be implemented in specifically configured computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, 3C, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A, 3B, 3C, and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for subverting open transmission of personally identifiable information through the use of tokenization. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for subverting open transmission of personally identifiable information through use of tokenization, comprising:
receiving, by a receiver of a processing server, a token request from an issuing financial institution;
identifying, by a processing device of the processing server, a digital token;
mapping, in a memory of the processing server, the identified digital token to a primary account number;
transmitting, by a transmitter of the processing server, the identified digital token to the issuing financial institution;
receiving, by the receiver of the processing server, a data request from a third party, wherein the data request includes the identified digital token;
replacing, by the processing device of the processing server, the identified digital token in the data request with the mapped primary account number;
transmitting, by the transmitter of the processing server, the data request including the mapped primary account number to the issuing financial institution;
receiving a data package including one or more items of personally identifiable information; and
forwarding the data package.

2. The method of claim 1, wherein the digital token is a random or pseudo-random alphanumeric value.

3. The method of claim 1, wherein the token request includes the primary account number.

4. The method of claim 1, wherein
the data package is received by the receiver of the processing server, and
the data package is forwarded by the transmitter of the processing server to the third party.

5. The method of claim 1, wherein
the data package is received by a receiver of the third party, and
the data package is forwarded by a transmitter of the third party to a requesting entity.

6. The method of claim 1, wherein the one or more items of personally identifiable information are encrypted in the data package.

7. The method of claim 6, wherein the processing server does not obtain or possess an encryption key suitable for decrypting the encrypted one or more items of personally identifiable information.

8. The method of claim 1, wherein
the data request is a transaction message formatted according to one or more standards and includes at least a message type indicator indicative of an authorization request and a plurality of data elements, wherein one of the plurality of data elements stores the identified digital token.

9. A system for subverting open transmission of personally identifiable information through use of tokenization, comprising:
a receiver of a processing server configured to receive a token request from an issuing financial institution;
a processing device of the processing server configured to identify a digital token;
a memory of the processing server configured to map the identified digital token to a primary account number; and
a transmitter of the processing server configured to transmit the identified digital token to the issuing financial institution, wherein
the receiver of the processing server is further configured to receive a data request from a third party, wherein the data request includes the identified digital token,
the processing device of the processing server is further configured to replace the identified digital token in the data request with the mapped primary account number;
the transmitter of the processing server is further configured to transmit the data request including the mapped primary account number to the issuing financial institution,
a data package is received that includes one or more items of personally identifiable information, and
the data package is forwarded.

10. The system of claim 9, wherein the digital token is a random or pseudo-random alphanumeric value.

11. The system of claim 9, wherein the token request includes the primary account number.

12. The system of claim 9, wherein
the data package is received by the receiver of the processing server, and
the data package is forwarded by the transmitter of the processing server to the third party.

13. The system of claim 9, wherein
the data package is received by a receiver of the third party, and the data package is forwarded by a transmitter of the third party to a requesting entity.

14. The system of claim 9, wherein the one or more items of personally identifiable information are encrypted in the data package.

15. The system of claim 14, wherein the processing server does not obtain or possess an encryption key suitable for decrypting the encrypted one or more items of personally identifiable information.

16. The system of claim 9, wherein
the data request is a transaction message formatted according to one or more standards and includes at least a message type indicator indicative of an authorization request and a plurality of data elements, wherein one of the plurality of data elements stores the identified digital token.

* * * * *